United States Patent
Chan et al.

(10) Patent No.: US 11,520,747 B2
(45) Date of Patent: Dec. 6, 2022

(54) METHOD AND SYSTEM FOR DETECTING AND RESOLVING A WRITE CONFLICT

(71) Applicant: HUAWEI TECHNOLOGIES CO., LTD., Guangdong (CN)

(72) Inventors: Yuk Kuen Chan, Markham (CA); Wenbin Ma, Sammamish, WA (US); Emad Boctor, Toronto (CA); Huaxin Zhang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 16/700,459

(22) Filed: Dec. 2, 2019

(65) Prior Publication Data

US 2021/0165762 A1    Jun. 3, 2021

(51) Int. Cl.
| | | |
|---|---|---|
| *G06F 16/178* | (2019.01) | |
| *G06F 16/18* | (2019.01) | |
| *G06F 16/22* | (2019.01) | |
| *G06F 16/23* | (2019.01) | |
| *G06F 9/54* | (2006.01) | |

(52) U.S. Cl.
CPC ........ *G06F 16/178* (2019.01); *G06F 16/1865* (2019.01); *G06F 16/2255* (2019.01); *G06F 16/2308* (2019.01); *G06F 9/544* (2013.01)

(58) Field of Classification Search
CPC .............. G06F 16/2308; G06F 16/178; G06F 16/1865; G06F 9/544; G06F 16/2255
USPC ........................................................ 707/608
See application file for complete search history.

(56) References Cited

U.S. PATENT DOCUMENTS

| | | | | |
|---|---|---|---|---|
| 10,853,182 | B1* | 12/2020 | Vig | .......................... G06F 16/23 |
| 2008/0120349 | A1* | 5/2008 | Kim | .................... G06F 16/2358 |
| 2013/0305039 | A1* | 11/2013 | Gauda | ................. H04L 67/1097 |
| | | | | 713/153 |

(Continued)

FOREIGN PATENT DOCUMENTS

CN      108762668 A    11/2018

OTHER PUBLICATIONS

Amazon Web Services, Inc., Amazon Aurora Multi-Master is Now Generally Available, Aug. 8, 2019, retrieved from https://aws.amazon.com/fr/about-aws/whats-new/2019/08/amazon-aurora-multimaster-now-generally-available/ on Dec. 2, 2019.

(Continued)

*Primary Examiner* — Shahid A Alam
(74) *Attorney, Agent, or Firm* — BCF LLP

(57) ABSTRACT

The disclosed systems and methods are directed for detecting and resolving write-write conflicts among a plurality of transactions received from master nodes of a multi-writer database system. The method includes receiving a plurality of REDO logs and storing the plurality of REDO logs in a buffer, each REDO log associated with the one of the plurality of transactions, selecting one REDO log of the plurality of REDO logs; persisting the transaction associated with the one REDO log in a local storage when a write-write conflict is detected between the one REDO log and at least one other REDO log of the plurality of REDO logs prior to committing the transaction associated with the one REDO log; and transmitting a status of the transaction associated with the one REDO log to a global transaction manager (GTM).

16 Claims, 7 Drawing Sheets

(56) References Cited

U.S. PATENT DOCUMENTS

| | | | |
|---|---|---|---|
| 2014/0258777 A1* | 9/2014 | Cheriton | G06F 16/2365 714/19 |
| 2015/0378774 A1* | 12/2015 | Vermeulen | G06F 9/466 707/703 |
| 2016/0110403 A1* | 4/2016 | Lomet | G06F 16/2255 707/695 |
| 2018/0189373 A1* | 7/2018 | Shevade | G06F 16/2358 |
| 2019/0129894 A1* | 5/2019 | Peng | G06F 16/219 |

OTHER PUBLICATIONS

International Search Report and Written Opinion of PCT/CN2020/120098; Yue Jiao; dated Jan. 12, 2021.

* cited by examiner

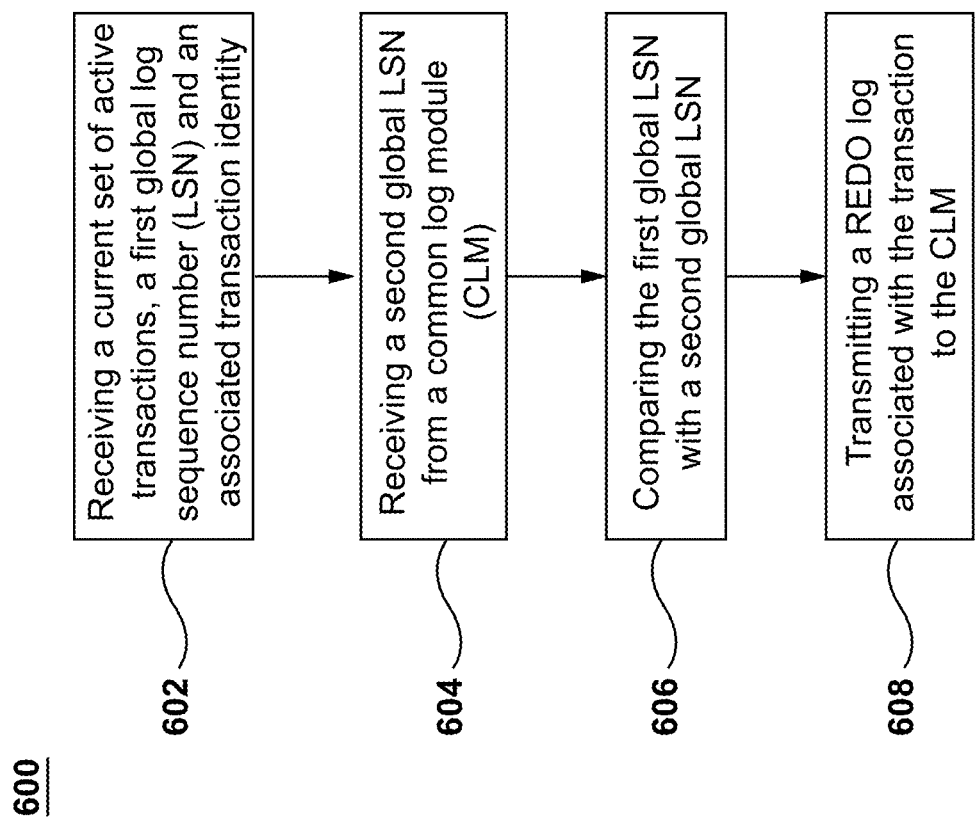

METHOD AND SYSTEM FOR DETECTING AND RESOLVING A WRITE CONFLICT

CROSS-REFERENCE TO RELATED APPLICATIONS

This is the first application filed for the instantly disclosed technology.

TECHNICAL FIELD

The present disclosure generally relates to the field of databases and, in particular, to method and system for detecting and resolving a write conflict associated with a database transaction among a plurality of master nodes updating a database.

BACKGROUND

With increasing advancements in computer technology (e.g., speed of processors, software functionality, transfer bandwidth, memory capacity, and the like), computer systems have become a vital part in almost all segments of technology. Such computer systems have generally contributed to increased computer applications handling a huge amount of data. Various server systems have been associated with such computer systems to store data in a database and process requests originating from user applications running on such computer systems to read data from the database, to modify existing data stored in the database, or write new data for storage in the database. As such, the computer systems and server systems rely on a database management system (DBMS) for managing data stored in the database.

A database is a data structure that stores an organized collection of information, including related information. A relational database includes "records" having "fields" representing different categories of information. As an example, a database associated with finances may have records for financial transactions where each record includes an amount owed, customer information, accounts receivables, and the like. Between the database and the user applications running on client devices that access data stored in the database, the DBMS is typically provided as a software intermediary. Generally, all requests to read data from or modify data stored in the database are received from user applications running on client devices and are processed by the DBMS. Data stored in a database can be added or removed from database, or data stored in the database be modified (i.e., updated), without any knowledge that user applications can concurrently access the database.

While interacting with such computer systems, many user applications running on client devices may perform a write to modify data on a same page of the database, resulting in a conflicting situation. Such problems can cause modifications to data stored in a page of the database by one application to be lost or overwritten by a modification or change to data on the same page by another application. Sometimes data stored in the database is modified, but the modified data is not immediately persisted to the database so that the data can be read by other applications before the data is modified by the application. This can result in inconsistent values of the data stored in the database being read by distinct applications. Further problems can result from applications using copies of data stored in the database that are later changed by other applications.

This problem has been addressed previously and certain solutions have also been suggested. In some solutions, DBMs uses sharding to ensure there is no conflict between different applications. Posgres-XC is one example. In such case, there is no need for conflict detection and resolution. However, there is no parallelism on processing the same piece of data across different applications, and there will be a significant failover period once a writer associated with the application goes offline.

On the other hand, some DBMSs address the problem of conflicting writes to the database via locking. However, locking does not scale in a cloud computing environment because each lock acquirement must be followed by an invalidation of data. Locking also requires a centralized place for lock manipulation.

Some DBMSs use optimistic conflict resolution to address the problem of conflicting writes instead of locks. If two applications perform a write to modify the same data stored in the database at the same time, a write conflict will be detected and resolved at a centralized. Amazon Aurora is one such example. Aurora uses a regional resolver for write conflicts between database transactions. If a database transaction is long running, it must have a large staging area to buffer all uncommitted database transactions. Should any of the uncommitted database transactions conflict with other database transactions during the extended life-cycle of a long-running database transaction, the long-running transaction will likely be aborted.

Consequently, there is a need for fast, efficient and economical conflict detection and resolution for multi-writer database systems.

SUMMARY

According to an aspect of the present disclosure, there is provided a method for detecting and resolving write-write conflicts among a plurality of transactions received from master nodes. The method includes: receiving, by a common log module (CLM), a plurality of REDO logs and storing the plurality of REDO logs in a buffer, each REDO log associated with the one of the plurality of transactions; selecting one REDO log of the plurality of REDO logs; persisting the transaction associated with the one REDO log in a local storage associated with the CLM when a write-write conflict is detected between the one REDO log and at least one other REDO log of the plurality of REDO logs prior to committing the transaction associated with the one REDO log; and transmitting a status of the transaction associated with the one REDO log to a global transaction manager (GTM.

In accordance with the preceding aspect of the present disclosure, the method includes repeating selecting, detecting, and transmitting are repeated for each REDO log stored in the buffer.

In accordance with the preceding aspect of the present disclosure, the transactions persisted in the local storage associated with the CLM are transmitted to the GTM in a group manner.

In accordance with any of the preceding aspects of the present disclosure, the method further includes mapping of a local log sequence number (LSN) associated with the plurality of master nodes to a global LSN.

In accordance with any of the preceding aspects of the present disclosure, the method further includes transmitting the global LSN to the plurality of master nodes.

In accordance with any of the preceding aspects s of the present disclosure, the method, further includes transmitting the global LSN to the GTM.

In accordance any of the preceding aspects of the present disclosure, detecting a write-write conflict include: extracting from the one REDO log a master node identity (ID), a base log sequence number (LSN), and a block number associated with the one REDO log; extracting a current status of a hash table, wherein the hash table contains block numbers, master node IDs and the corresponding LSNs; checking for the presence of the block number associated with the one REDO log in the hash table; and if the block number associated with the one REDO log is not present in the hash table, a write-write conflict is not detect and the block number, master node ID and the end LSN associated with the one REDO log in the hash table are updated; if the block number associated with the one REDO log is present in the hash table, checking the master node IDs associated with the one REDO log and the hash table; and if both the master node IDs are same, a write-write conflict is not detect and the latest LSN with the end LSN associated with the one REDO log is updated; if both the master IDs are different, comparing the base LSN and the latest LSN; and if the base LSN is greater than the latest LSN, a write-write conflict is not detect the latest LSN with the end LSN associated with the one REDO log is updated; if the base LSN is smaller than the latest LSN, a write-write conflict is detected and the transaction associated with the one REDO log is aborted.

In accordance with any of the preceding aspects of the present disclosure, the method further includes persisting the transaction associated with the one REDO log in a common storage when a write-write conflict is not detected between the one REDO log and any other REDO log of the plurality of REDO logs prior to committing the transaction associated with the one REDO log.

According to another aspect of the present disclosure, there is provided a system comprising a processor; a non-transitory memory storing instructions which, when executed by the processor, cause the system to detect and resolve write-write conflicts among a plurality of transactions received from master nodes of a multi-writer database system by: receiving a plurality of REDO logs and storing the plurality of REDO logs in a buffer, each REDO log associated with the one of the plurality of transactions; selecting one REDO log of the plurality of REDO logs; persisting the transaction associated with the one REDO log in a local storage when a write-write conflict is detected between the one REDO log and at least one other REDO log of the plurality of REDO logs prior to committing the transaction associated with the one REDO log; and transmitting a status of the transaction associated with the one REDO log to a global transaction manager (GTM).

In accordance the preceding aspect of the present disclosure, selecting, persisting, transmitting are repeated for each REDO log stored in the buffer.

In accordance the preceding aspect of the present disclosure, the transactions persisted in the local storage to the CTM in a group manner.

In accordance any of the preceding aspect of the present disclosure, the instructions, when executed by the processor, cause the system to detect and resolve write-write conflicts by: mapping of a local log sequence number (LSN) associated with the plurality of master nodes to a global LSN.

In accordance any of the preceding aspect of the present disclosure, the instructions, when executed by the processor, cause the system to detect and resolve write-write conflicts by: transmitting the global LSN to the plurality of master of master nodes.

In accordance any of the preceding aspect of the present disclosure, the instructions, when executed by the processor, cause the system to detect and resolve write-write conflicts further by: transmitting the global LSN to the GTM.

In accordance any of the preceding aspect of the present disclosure, a write-write conflict is detected by: extracting from the one REDO log a master node identity (ID), a base log sequence number (LSN), and a block number associated with the one REDO log; extracting a current status of a hash table, wherein the hash table contains block numbers, master node IDs and the corresponding LSNs; checking for the presence of the block number associated with the one REDO log in the hash table; and if the block number associated with the one REDO log is not present in the hash table, a write-write conflict is not detect and the block number, master node ID and the end LSN associated with the one REDO log in the hash table are updated; if the block number associated with the one REDO log is present in the hash table, checking the master node IDs associated with the one REDO log and the hash table; and if both the master node IDs are same, a write-write conflict is not detect and the latest LSN with the end LSN associated with the one REDO log is updated; if both the master IDs are different, comparing the base LSN and the latest LSN; and if the base LSN is greater than the latest LSN, a write-write conflict is not detect the latest LSN with the end LSN associated with the one REDO log is updated; if the base LSN is smaller than the latest LSN, a write-write conflict is detected and the transaction associated with the one REDO log is aborted.

In accordance any of the preceding aspect of the present disclosure, the instructions, when executed by the processor, cause the system to detect and resolve write-write conflicts further by: persisting the transaction associated with the one REDO log in a common storage when a write-write conflict is not detected between the one REDO log and any other REDO log of the plurality of REDO logs prior to committing the transaction associated with the one REDO log.

According to another aspect of the present disclosure, there is provided a method for executing a transaction, the method executable by a master node comprising initiating a current transaction, receiving, from a global transaction manager (GTM), a set of active transactions, a first global log sequence number (LSN) and an associated transaction identifier (ID) corresponding to a transaction, receiving a second global LSN from a common log module (CLM), comparing the first global LSN with the second global LSN to determine whether the first global LSN is smaller than the second global LSN, aborting the current transaction, and if the first global LSN is greater than the second global LSN, transmitting a REDO log associated with the current transaction to the CLM.

BRIEF DESCRIPTION OF THE FIGURES

The features and advantages of the present disclosure will become apparent from the following detailed description, taken in combination with the appended drawings, in which:

FIG. 7 depicts a flow diagram of a process implemented in the master node for executing a transaction, in accordance with various aspects of present disclosure.

Figure 1:
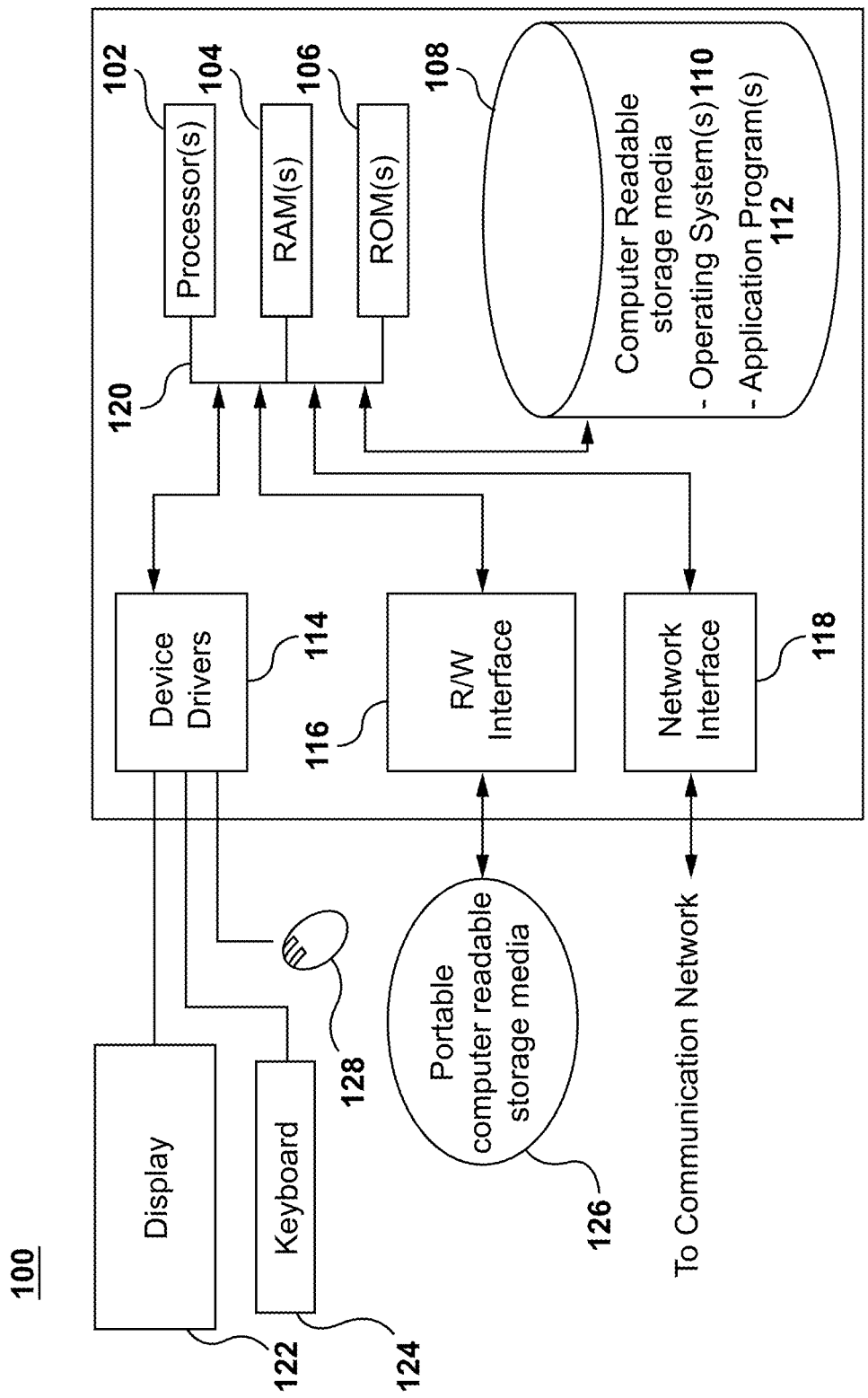
FIG. 1 depicts a block diagram of components of a master node, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

FIG. 1 depicts a high-level block diagram of components of a master node 100, in accordance with various embodiments of the present disclosure. It should be appreciated that FIG. 1 provides only an illustration of one implementation of the master node 100 and does not imply any limitations with regard to the environments in which different embodiments may be implemented. Many modifications to the depicted environment can be done to implement the master node 100 without departing from the principles presented herein. The master node 100 may be a server, a desktop computer, a laptop computer, a tablet, a smart phone, a personal digital assistant or any device that may be configured to implement the present technology, as should be understood by a person skilled in the art.

As shown, the master node 100 employs one or more processors 102, one or more computer-readable random access memories (RAMs) 104, one or more computer-readable read only memories (ROMs) 106, one or more computer-readable storage media 108, device drivers 114, a read/write (R/W) interface 116, a network interface 118, all interconnected over a communication fabric 120. The communication fabric 120 may be implemented with any architecture designed for passing data and/or control information between processors (such as microprocessors, communications and network processors, etc.), system memory, peripheral devices, and any other hardware components within a system.

One or more operating systems 110 and one or more application programs 112 are stored on one or more of the computer-readable storage media 108 for execution by the one or more of the processors 102 via the one or more of the respective RAMs 104 (which typically include a cache memory). In the illustrated embodiment, each of the computer-readable storage media 108 maybe a magnetic disc storage device of an internal hard drive, CD-ROM, DVD, memory stick, magnetic tape, magnetic disk, optical disc, a semiconductor storage device such as RAM, ROM, EPROM, flash memory or any other computer-readable tangible storage device that can store a computer program and digital information.

The R/W drive or interface 116 reads from and writes to one or more portable computer-readable storage media 126. Application programs 112 may be stored on one or more of the portable computer-readable storage media 126, read via the respective R/W drive or interface 116 and loaded into the respective computer-readable storage media 108.

Further, the network interface 118 may be based on a TCP/IP adapter card or wireless communication adapter (such as a 4G wireless communication adapter using OFDMA technology). The application programs 112 on the master node 100 may be downloaded to the master node 100 from an external computer or external storage device via a communication network (for example, the Internet, a local area network or other wide area network or wireless network) and network interface 118. From the network interface 118, the application programs 112 may be loaded onto computer-readable storage media 108. The master node 100 may connect to routers, firewalls, switches, gateway computers and/or edge servers of the communication network using copper wires, optical fibers, wireless transmission, and the like.

The master node 100 may also include a display screen 122, a keyboard or keypad 124, and a computer mouse or touchpad 128. The device drivers 114 may interface with the display screen 122 for imaging, with the keyboard or keypad 124, with the computer mouse or touchpad 128, and/or with the display screen 122 (which may be a touch-sensitive display) for alphanumeric character entry and user selections. The device drivers 114, R/W interface 116 and network interface 118 may comprise hardware and software (stored on computer-readable storage media 108 and/or ROM 106).

Figure 2:
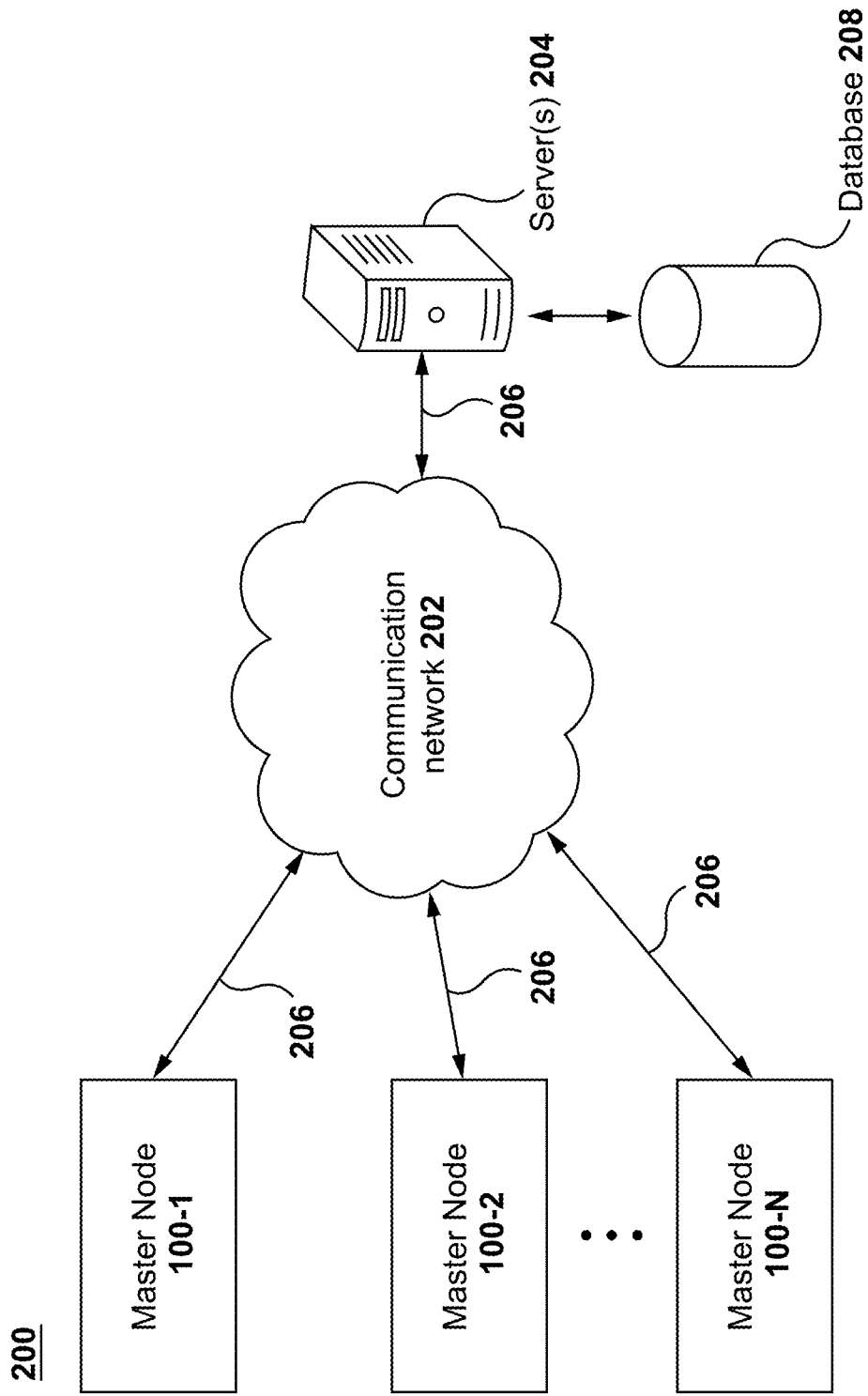
FIG. 2 depicts a system being implemented in accordance with various embodiments of the present disclosure.

FIG. 2 depicts a multi-writer database system 200 (hereinafter system 200) implemented in accordance with various embodiments of the present disclosure. As shown, the system 200 comprises N master nodes 100-1, 100-2 . . . 100-N. Each of the N master nodes 100-1, 100-2 . . . 100-N includes the same components as the master node 100. Further, each of the N master nodes 100-1, 100-2 . . . 100-N is coupled to a communication network 202 via a respective communication link 206. The communication network 202 may be implemented using any suitable technologies such as the internet, wide-area communications network, local-area communications networks, private communications network, etc.

How the communication link 206 is implemented is not particularly limited and will depend on how the N master nodes 100-1, 100-2 . . . 100-N are implemented. Merely as an example and not as a limitation, in those embodiments of the present disclosure where at least one of the N master nodes 100-1, 100-2 . . . 100-N includes a network interface 118 based on a wireless communication device (such as a smart phone), the communication link 206 can be implemented as a wireless communication link (such as but not limited to, a 3G communications network link, a 4G communications network link, a Wireless Fidelity, or WiFi® for short, Bluetooth® and the like). In those examples, where at least one of the N master nodes 100-1, 100-2 . . . 100-N includes a network interface 118 a TCP/IP adapter card, the communication link 206 can be either wireless (such as WiFi®, Bluetooth® or the like) or wired (such as an Ethernet based connection).

Implementations for the plurality N master nodes 100-1, 100-2 . . . 100-N, the communication network 202, and the communications link 206 are provided for illustration purposes only. As such, those skilled in the art will easily appreciate other specific implementation details for the N master nodes 100-1, 100-2 . . . 100-N, the communication network 202, and the communications link 206. As such, examples provided herein above are meant to limit the scope of the present technology.

Further, the communications network 202 is also coupled to one or more servers 204. The one or more servers 204 can be implemented as conventional computer servers. In certain embodiments of the present disclosure, the one or more servers 204 can be implemented as a Dell™ PowerEdge™ Server running Microsoft™ Windows Server™ operating system. The one or more servers 204 may further operatively coupled to a database 208. By way of example, the database 208 may contain a tangible computer-readable storage medium including Read-Only Memory (ROM) and/or Random-Access Memory (RAM), one or more fixed storage devices in the form of, by way of example, hard disk drives (HDDs), solid-state drives (SSDs), and flash-memory cards. The database 208 stores shared data objects and the shared data objects may include a file in a file system, a record in a database, a block of data, a page, or the like. The N master nodes 100-1, 100-2 . . . 100-N may have access to a shared data object in the database 208. The N master nodes 100-1, 100-2 . . . 100-N each store a copy of the database 208. The master nodes 100-1, 100-2 . . . 100-N, the communications network 202, and the server 204 together form a distributed database system.

Needless to say, the one or more servers 204 can be implemented in any other suitable hardware and/or software and/or firmware or a combination thereof. In certain embodiments, the database 208 may be implemented within one or more servers 204. Furthermore, the one or more servers 204 can be implemented in different hardware or software therebetween.

Figure 3:
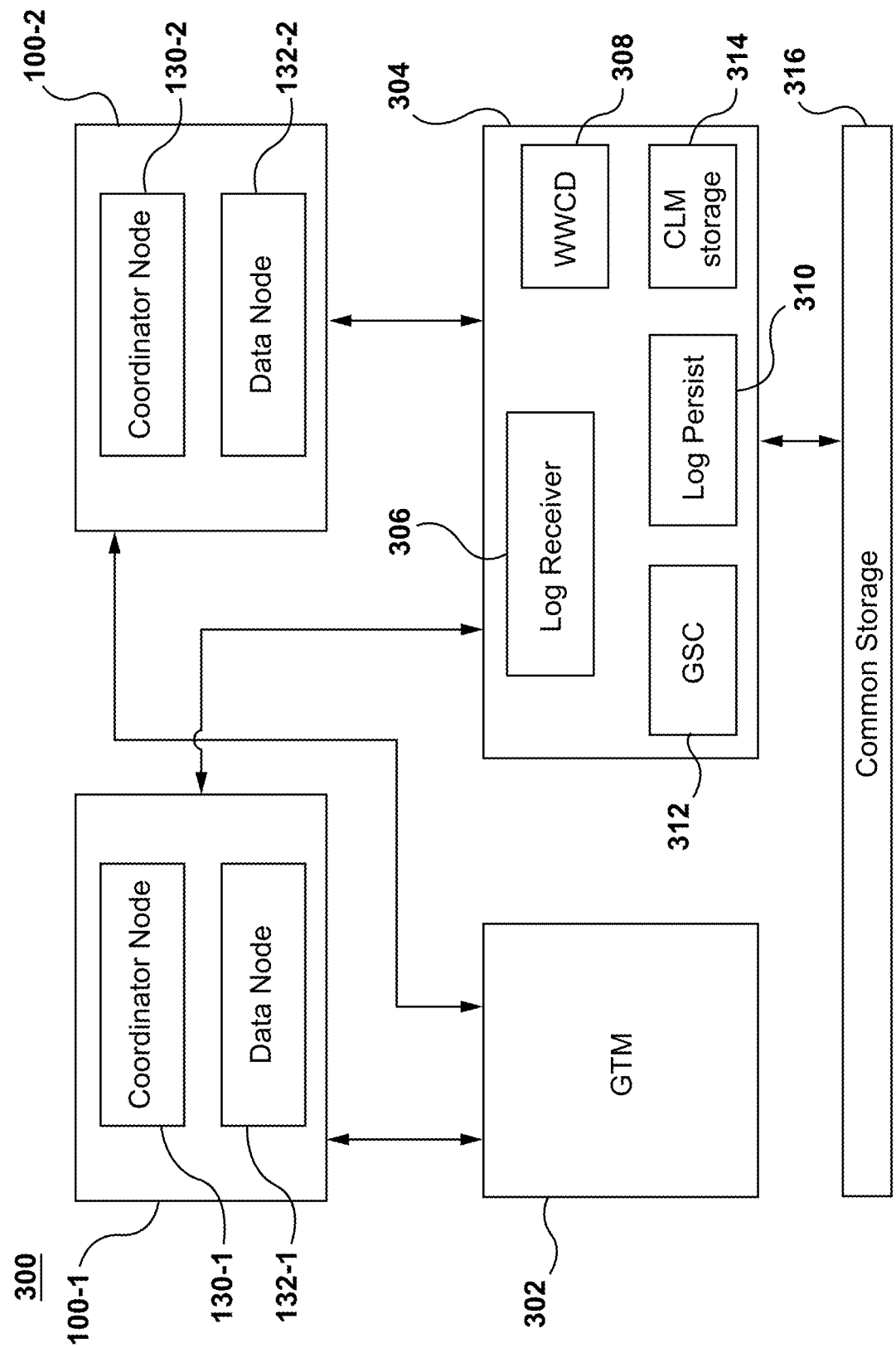
FIG. 3 depicts a system implementing a common log module (CLM) to detect and resolve a write-write conflict across a plurality of master nodes, in accordance with various embodiments of the present disclosure.

FIG. 3 depicts a system 300 implementing a common log module (CLM) 304 to detect and resolve write-write conflicts between transactions received from a plurality of master nodes 100-1, 100-2 . . . 100-N, in accordance with various embodiments of the present disclosure. A write-write conflict occurs when at least two master nodes 100-1, 100-2 . . . 100-N send transactions that each include a request to write to the same page, or tuple of a database, which results in conflicting data. A write-write conflict does not occur when at least two master nodes 100-1, 100-2 . . . 100-N send transactions that include a request to write to different pages or tuples of a database. For the sake of simplicity, the implementation of the system 300 has been illustrated with two master nodes 100-1 and 100-2, without losing the generality of the concepts presented herein. As shown, the master node 100-1 includes a coordinator node 130-1 and a data node 132-1. Similarly, the master node 100-2 includes a coordinator node 130-2 and a data node 132-2. The system 300 further includes a global transaction manager (GTM) 302, a CLM 304 and a common storage 316.

The CLM 304 includes a log receiver 306, a write-write conflict detector (WWCD) 308, a log persist module 310, a global status cache (GSC) module 312, and a CLM storage 314. It will be understood that other elements may be present, but are not illustrated for the purpose of tractability and simplicity.

The log receiver module 306 receives a plurality of REDO logs from the master nodes 100-1 and 100-2 and provides the plurality of REDO logs to a log buffer (not shown) associated with the log receiver 306 for storage therein. Each REDO log received by the log receiver module 306 is associated with a transaction. Each respective REDO log describes or represents changes made to one or more pages of the database by the transaction associated with the respective REDO log. In some embodiments, the log receiver 306 receives groups of REDO logs from the master nodes 100-1 and 100-2 and provides each group of REDO logs to the log buffer (not shown) associated with the log receiver 306 for storage therein. As such, each of the master nodes 100-1 and 100-2 may be configured to accumulate and group together various associated REDO logs and transmit the group of REDO logs towards the CLM 304.

The WWCD 308 is configured to detect write-write conflicts. In order to detect a write-write conflict, the WWCD 308 reads one REDO log from the log buffer (not shown) at a time and checks for a write-write conflict between the one REDO log and all other REDO logs in the log buffer. The WWCD 308 checks for a write-write conflict by analyzing the one REDO log to determine whether the one REDO log modifies the same page (or same tuple) as any other REDO log in the log buffer. After detecting a write-write conflict, the WWCD 308 provides the one REDO log to the log persist module 310. The one REDO log contains an identifier (ID) associated with the master node (referred to hereinafter as master node ID) (e.g. master node 100-1, where the REDO log comes from) and log sequence number (LSN) mapping information (i.e., information indicative of a mapping of a local LSN associated with the master node (e.g. master node 100-1).

The log persist module 310 receives the one REDO log from the WWCD 308 and persists the received one REDO log to the CLM storage 314. It is to be noted that CLM 304 may persist all of the non-conflicting REDO logs received from various master nodes 100-1 and 100-2 to the common storage 316 (external to the CLM 304) in an asynchronous manner.

The GSC 312 module reads the REDO logs that have been persisted to the CLM storage 314, extracts information from the REDO logs, including the list of transactions, dirty pages numbers, master node ID, local LSN, and global LSN etc., and provides the extracted information to the master nodes 100-1 and 100-2.

The GTM 302 module provides a snapshot of the database, in response to receiving, from each master node 100-1 and 100-2, a request for such information. The snapshot includes information related to a current status of the database, including a list of historical transactions, an identifier of each transaction in the list of transactions (referred to hereinafter as transaction ID), a status of each transaction in the list historical transactions (i.e., whether a given transaction in the list of transactions is active or committed), and a global LSN associated with each transaction ID. In this manner, the GTM 302 module may provide synchronization and consistency among different master nodes 100-1 and 100-2 on what data is visible to each master node 100-1 and 100-2.

Figure 4:
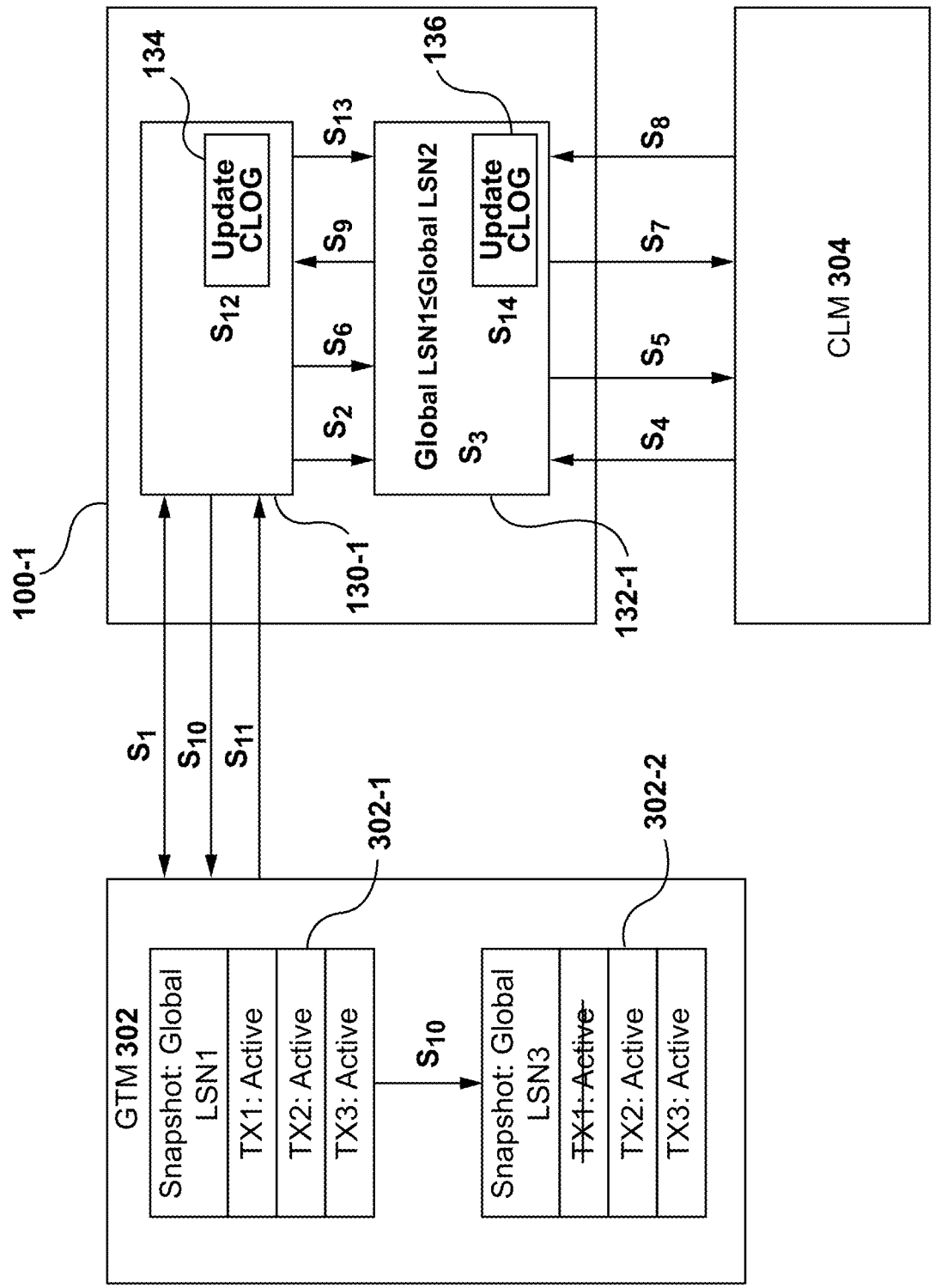
FIG. 4 depicts a high-level block diagram associated with the flow of information corresponding to a transaction, in accordance with various aspects of present disclosure.

FIG. 4 depicts a high-level block diagram associated with the flow of information corresponding to a transaction between the master node 100-1, the GTM 302, and CLM 304, in accordance with various aspects of present disclosure. As shown, the coordinator node 130-1 initiates a transaction at step $S_1$, and requests the snapshot of the database from the GTM module 302.

At step $S_2$, the coordinator node 130-1 then passes the snapshot of the database received from the GTM module 302, and an identifier of the initiated transaction (transaction ID) to the data node 132-1. At step $S_3$, the data node 132-1 compares its own global LSN (received from the CLM 304, e.g. First global LSN) with the global LSN associated with the transaction ID 302-1 (e.g. second global LSN). In so doing, the data node 132-1 ensures that there is no timing hole between the GTM 302 and the data node 132-1.

If the first global LSN is smaller or equal to the second global LSN, the data node 132-1 aborts the transaction as the transaction may be a conflicted transaction. At step $S_4$, the CLM 304, provides dirty page numbers (i.e., the page numbers of the pages of the database that have been modified) and the second global LSN to the data node 132-1. After receiving the dirty page numbers and second global LSN, at step $S_5$, the data node 132-1 provides the REDO logs for the transaction along with the transaction ID 302-1 of the transaction to the CLM 304 indicating enough data has been accumulated, or the transaction is explicitly committed/aborted.

At step $S_6$, the coordinator node 130-1 sends a command to the data node 132-1 commit the transaction. At step $S_7$, the data node 132-1 provides a REDO log associated with the transaction to the CLM 304. After the CLM 304 processes the group of REDO logs, the CLM 304 transmits a latest global LSN associated with the transaction and a status of the transaction (indicating whether the transaction was committed or aborted) to the data node 132-1 at step $S_8$.

At step $S_9$, the data node 132-1 transmits the latest global LSN and status of the transaction to the coordinator node 130-1. At Step $S_{10}$, the coordinator node 130-1 provides the GTM module 302 with the status of the transaction. At the same time, the GTM module 302 updates the global LSN associated with the transaction and the status of the transaction. At step $S_{11}$ the GTM 302 module provides an acknowledgement to the coordinator node 130-1. After receiving the acknowledgement from the GTM module 302, the coordinator node 130-1 updates the status of the transaction in its update common log (CLOG) 134. At step $S_{13}$, the coordinator node 130-1 provides dirty page numbers and the latest global LSN to the data node 132-1 and at step $S_{14}$, the data node 132-1 updates its update common log (CLOG) 136 to include dirty page numbers and the latest global LSN.

Figure 5:
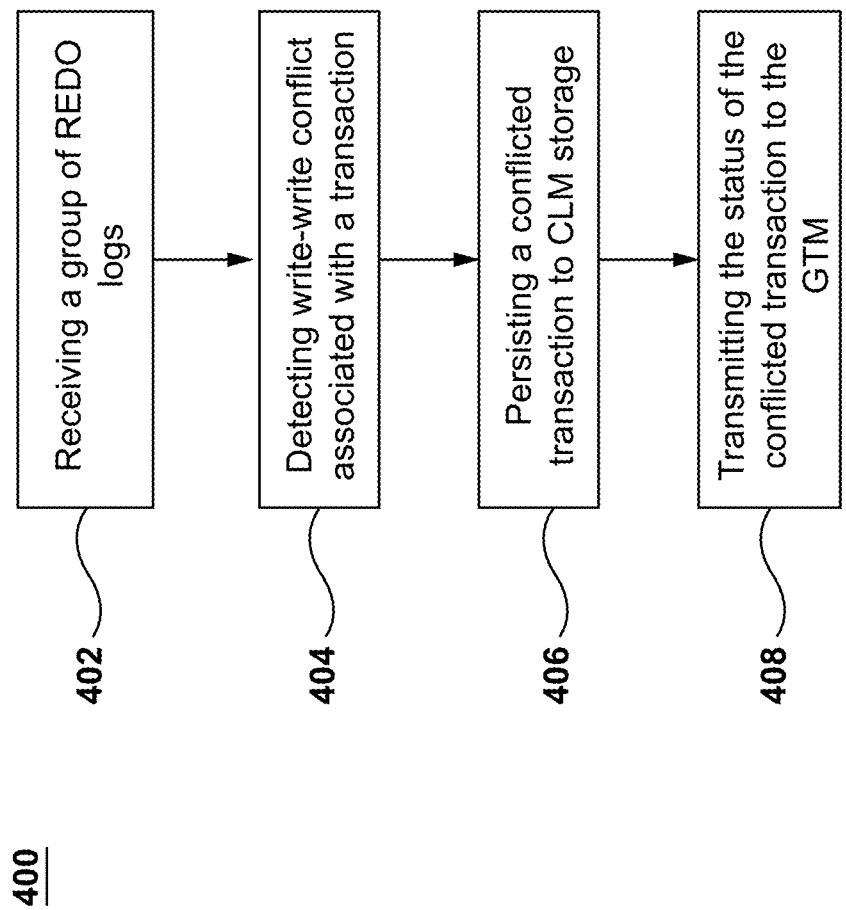
FIG. 5 depicts a flow diagram of a method implemented in the CLM to process a group of REDO logs received from the master nodes, in accordance with various aspects of present disclosure.

FIG. 5 depicts a flow diagram of a process 400 implemented in the CLM 304 to process group of REDO logs received from the master nodes 100-1 and 100-2, in accordance with various aspects of present disclosure. As shown, the process 400 commences at task block 402, where the log receiver 306 receives a group of REDO logs from the master nodes 100-1 and 100-2. The log receiver 306 then stores the received group of REDO logs to the log buffer (not shown) associated with the log receiver 306.

The process then advances to task block 404, where the WWCD 308 analyzes one REDO log at a time from the log buffer (not shown). The WWCD 308 checks for write-write conflicts as described in further detail below. After detecting a write-write conflict, the WWCD 308 provides information including an identifier (ID) associated with the master node (e.g. master node 100-1, where the REDO log is received from) and LSN mapping information (i.e., information indicative of the mapping of a local LSN associated with the master node (e.g. master node 100-1) against a global LSN at CLM 304) to the log persist module 310.

At task block 406, where the log persist module 310 persists the information received from the WWCD 308 to the CLM storage 314. Finally, at task block 408, the CLM 304 transmits the status of the conflicted transaction from CLM storage 314 to the GTM 302.

Figure 6:
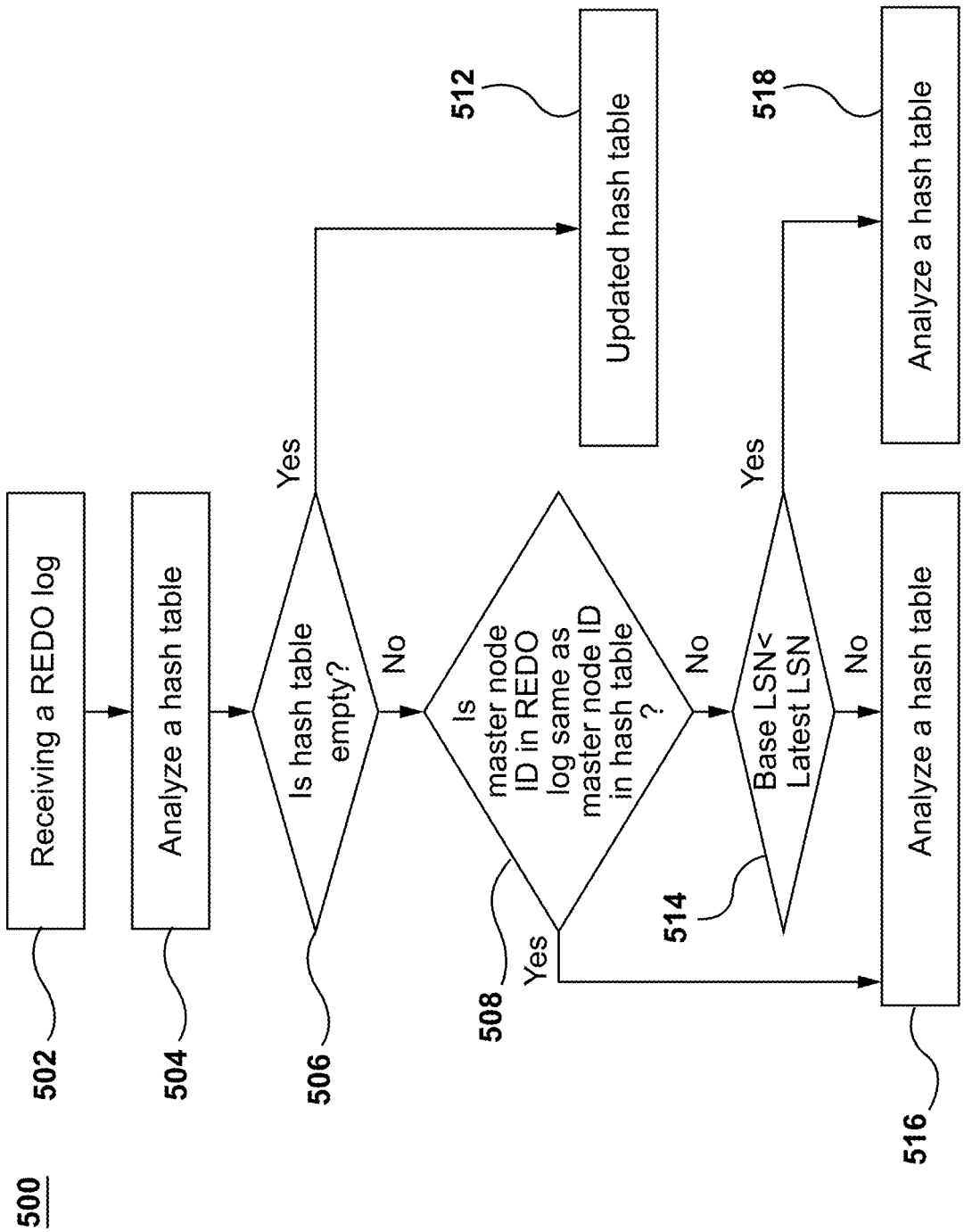
FIG. 6 depicts a flow diagram of a process implemented in the write-write conflict detector to detect the write-write conflict, in accordance with various aspects of present disclosure.

FIG. 6 depicts a flow diagram of a process 500 implemented in the WWCD 308 to detect a write-write conflict, in accordance with various aspects of present disclosure. As shown, the process 500 begins at task block 502, where the WWCD 308 receives the one REDO log from the log receiver 306. In certain embodiments, the one REDO log contains a master node ID, base LSN, end LSN, and a block number associated with the master node (e.g. master node 100-1, where the log comes from).

The process 500 then proceeds to task block 504, where the WWCD 308 analyzes a hash table (e.g. hash table as shown in Table 1). In certain embodiments, the hash table may contain a block number column (acting as hash key), a master node ID column (storing the master node ID of the last master node that has successfully modified the requested page) and a latest LSN column (storing the end LSN associated with the last REDO log applied on the requested page). In certain embodiments, the WWCD 308 may extract a current status of the hash table (e.g. Table 1).

TABLE 1

Hash table

| Block No. | Mater node ID | Latest LSN |
|---|---|---|
| A | 1 | 100 |
| B | 2 | 200 |
| C | 1 | 300 |
| D | 2 | 200 |

The process 500 then advances to task block 506, where the WWCD 308 checks the status of the block number column in the hash table (e.g. Table 1) to determine whether the block number associated with the REDO log is present or not. If the block number column in the hash table (e.g. Table 1) does not contain the block number associated with the REDO log the process 500 advances to task block 512. At task block 512, the WWCD 308 confirms that there is no write-write conflict, updates the hash table with the block number, master node ID and base LSN associated with the REDO log so that the transaction can be processed. However, if the block number column in the hash table (e.g. Table 1) is not empty, the process 500 then proceeds to task block 508.

At task block 508, corresponding to the block number, the WWCD 308 compares the master node ID associated with the REDO log and the master node ID corresponding to the block number in the hash table (e.g. Table 1). If both master node IDs are same, at task block 516, the WWCD 308 confirms that there is no write-write conflict and the transaction can be processed. As in this case, it will be the same master node (e.g. master node 100-1) modifying the page again. However, if both master node IDs are different, the process 500 then moves to task block 514.

At task block 514, the WWCD 308 compares base LSN associated with the REDO log and the latest LSN corresponding to the block number in the hash table (e.g. Table 1). If the latest LSN is greater than the base LSN, at task block 516, the WWCD 308 confirms that there is no write-write conflict and updates the latest LSN associated with the block number in the hash table with the end LSN associated with the REDO log. However, if the latest LSN is smaller than the base LSN, at task block 518, the WWCD 308 confirms a write-write conflict and the transaction associated with the REDO log (i.e., the conflicted transaction) is aborted by the CLM 304 before the conflicted transaction is committed. To this end, the WWCD 308 forwards the REDO log associated with the conflicted transaction to the log persist module 310. The log persist module 310, persist the REDO log associated with the conflicted transaction to the CLM storage 314.

FIG. 7 depicts a flow diagram of a process 600 implemented in the master node 100-1 for executing a transaction, in accordance with various aspects of present disclosure. As shown, the process 600 begins at task block 602, where the master node 100-1 initiates a transaction, requests a snapshot of the database from the GTM 302, and receives the snapshot of the database from the GTM 302.

The process 600 then advances to task block 604, where the master node 100-1 receives a second global LSN from the CLM 304. As discussed above, CLM 304 may supply the master node 100-1 with the global LSN map to the local LSN associated with the master node 100-1.

The process 600 advances to task block 606, where the master node 100-1 compares the first global LSN with the second global LSN. As previously discussed, the data node 132-1 associated with the master node 100-1, after receiving the first global LSN and the second global LSN, compares the first global LSN to the second global LSN. In so doing, the data node 132-1 confirms that there is no timing hole in the updates of previous transactions on the page.

Finally, at task block 608, the master node 100-1 transmits the REDO log associated with the transaction to the CLM 304. As noted above, after the data node 132-1 confirms that there is no timing hole in the updates of previous transactions on the page, the master node 100-1 may transmit the REDO log associated with the transaction to the CLM 304.

Returning to FIG. 3, in certain embodiments the master node 100-1 may modify a lot of data stored in the database, but none of the modified data should be visible to any other transactions associated with the master node 100-2 before the transaction associated with the master node 100-1 has been committed. At the same time, the REDO log associated with each transaction in the group of REDO logs received from the master node 100-1 may be provided to CLM 304 and the REDO log for each transaction may get persisted into the common storage 316. In this manner, the system 300 may provide correctness along with performance improvements.

In certain embodiments, to ensure that the uncommitted transaction associated with the master node 100-1 is not visible to the master node 100-2, the system 300 may employ for example, a multi-version concurrency control (MVCC) process or any other such process. As discussed above, the group of REDO logs, while being transmitted to CLM 304, may be accompanied by the transaction ID 302-1. In certain embodiments, if the transaction ID 302-1 is not marked as committed in the GTM 302, the updates associated with such transaction may not be visible to other transactions associated with master node 100-2. To this end, the CLM 304 may update the GTM 302 commit/abort status of an ongoing transaction prior to updating the master nodes 100-1 and 100-2.

After the transaction initiated by the master node 100-1 is marked as committed in GTM 302, all of the modifications to data stored in a page the database associated with the transaction may be persisted to the common storage 316. Because the modifications to data stored in a page (or tuple) of the database may be persisted to the common storage 316 in an asynchronous manner, by the time another transaction associated with the master node 100-2 tries to read the same page, the transaction may not be able to find all modifications to the data performed by the transaction associated with the master node 100-1. As discussed earlier, the GTM 302 may provide a snapshot of the database together with the global LSN to the master node (e.g. master nodes 100-1 and 100-2), when the master node (e.g. master nodes 100-1 and 100-2) initiates the transaction. This global LSN may be bounded to all transactions, and when the master node (e.g. master node 100-2) reads data from the common storage 316, the master node (e.g. master node 100-2) has to communicate to the common storage 316 the global LSN and wait, until the common storage 316 has received and processed that data from CLM 304 associated with the previous master node (e.g. master node 100-1).

It is to be noted that the common storage 316 persists REDO logs associated with the non-conflicting transactions only. The REDO logs associated with the conflicting transactions are stored in the CLM storage 314. As discussed, the REDO logs associated with the non-conflicting transactions are transmitted to the common storage 316 asynchronously, and the common storage 316 only applies the non-conflicting REDO logs to the associated pages upon receiving.

The above functionality of the system 300 is to ensure that there is no timing hole between the CLM 304, the master nodes 100-1 and 100-2, common storage 316, and the GTM 302. To further avoid the timing holes, in certain embodiments, the data nodes 132-1 and 132-2 may wait till a bus (not shown) from CLM 304 returns a global LSN to the master nodes 100-1 and 100-2, which is greater than the global LSN received from the GTM 302. In this manner, the system 300 may avoid the timing hole when the GTM 302 is faster than the data nodes 132-1 and 132-2. That is when the transaction starts and the corresponding master nodes 100-1 and 100-2 receive the global LSN from the GTM 302, the received global LSN is ahead of the global LSN received from the CLM 304.

In another case, a current transaction associated with the data node (e.g. data node 132-2) sees a tuple stored in the database being modified by a previous transaction associated with another data node (e.g. data node 132-1), however, the previous transaction associated with another data node (e.g. data node 132-1) is marked as committed. However, according to GTM 302, the previous transaction is still active which implies that the bus (not shown) from CLM 304 has returned the global LSN faster than GTM 302. In this case, the data node (e.g. data node 132-2) waits and sends a request to the GTM 302 for the refreshed global LSN until another transaction is marked as committed from the GTM 302 or else the data node (e.g. data node 132-2) may abort the current transaction. With this said, each data node 132-1 and 132-2 and GTM 302 may work in conjunction with each other to ensure the correct consistent global transaction status at any time.

In certain embodiments, the system 300 may utilize a bus architecture (not shown) to synchronously communicate with the GTM 302 in a group manner. As such, after a write-write conflict is detected, the associated REDO log may be persisted in the CLM storage 314. The CLM 304 combines various committed/conflicted/aborted transactions, their latest global LSN, and list of pages modified into a package for each master node 130-1 and 130-2. Each master node 130-1 and 130-2 may periodically receive the packages from CLM 304, using the bus architecture (not shown). The frequency associated with the bus architecture (not shown) may be equivalent to the frequency with which CLM 304 prepares the packages.

In certain embodiments, since each master node 100-1 and 100-2 may communicate with the CLM 304 at different times, each master node 100-1 and 100-2 may have an associated local LSN. As such, when master nodes 100-1 and 100-2 are modifying the same page of the database, each master node 100-1 and 100-2 provides the LSN associated with the. The master nodes 100-1 and 100-2 may provide the associated local LSN along with the REDO logs to the CLM 304. The CLM 304 may combine all the received REDO logs and map the associated local LSNs to a global LSN. Further, the CLM 304 may provide the combined REDO logs along with the global LSN to the common storage 316. Moreover, the CLM 304 may provide the global LSN to each master node 100-1 and 100-2 at the end of each epoch. Thus, each master node 100-1 and 100-2 may operate on their own pace and hence boosting up performance by better concurrency.

Thus, by virtue of system 300, there are several advantages that may be added to an existing system. Such as the system 300 does not require an unbounded staging area for uncommitted transactions, as all the modifications to a page may be materialized into the common storage 316 as master nodes 100-1 and 100-2 generate such modifications.

In certain embodiments, if the master node 100-1 is writing on a tuple of a page of the database (or a piece of data in a page of the database), and is notified the master node 100-2 has an uncommitted transaction on the same tuple, the master node 100-1 may stall on the write, following a serializable writing order. Also, when write-write conflicts are detected for pages of the database, the CLM 304 transmits a notification to the master nodes 100-1 and 100-2 before a conflicting transaction is committed, thereby reducing the conflicting writes to tuples of the page. Because a write-write conflict is detected between the transactions before the transactions are committed, the system 300 has a flexibility to decide which transaction is to be aborted. In so doing, the chosen transaction may abort early without the system 300 performing further processing on the chosen transaction.

Moreover, the CLM 304 updates the GTM 304 in group manner rather than updating the GTM 304 for every committed or aborted transaction. This group processing reduces interactions between the CLM 304 and the GTM 302, and boosts up system performances.

It will be appreciated that the method 400, 500, and 600 may also be performed by computer programs, which may exist in a variety of forms both active and inactive. Such as the computer programs may exist as a software program(s) comprised of program instructions in source code, object code, executable code or other formats. Any of the above may be embodied in a computer-readable medium, which include storage devices and signals, in compressed or uncompressed form. Representative non-transitory computer-readable storage devices include conventional computer system RAM (random access memory), ROM (read only memory), EPROM (erasable, programmable ROM), EEPROM (electrically erasable, programmable ROM), and magnetic or optical disks or tapes. Representative computer-readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer-readable medium. The same is true of computer networks in general.

It is to be understood that the operations and functionality of the described system 300, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for detecting and resolving write-write conflicts among a plurality of transactions received from master nodes of a multi-writer database system, the method comprising:
   receiving, by a common log module (CLM), a plurality of REDO logs and storing the plurality of REDO logs in a buffer, each REDO log associated with the one of the plurality of transactions;
   selecting one REDO log of the plurality of REDO logs;
   persisting the transaction associated with the one REDO log in a local storage associated with the CLM when a write-write conflict is detected between the one REDO log and at least one other REDO log of the plurality of REDO logs prior to committing the transaction associated with the one REDO log; and
   transmitting a status of the transaction associated with the one REDO log to a global transaction manager (GTM);
   wherein detecting a write-write conflict further comprises:
      extracting from the one REDO log a master node identity (ID), a base log sequence number (LSN), and a block number associated with the one REDO log;
      extracting a current status of a hash table, wherein the hash table contains block numbers, master node IDs and the corresponding LSNs;
      checking for the presence of the block number associated with the one REDO log in the hash table; and
      when the block number associated with the one REDO log is not present in the hash table, a write-write conflict is not detected and the block number, master node ID and the end LSN associated with the one REDO log in the hash table are updated.

2. The method of claim 1, wherein the selecting, persisting, and transmitting are repeated for each REDO log stored in the buffer.

3. The method of claim 2, further comprising transmitting the transactions persisted in the local storage associated with the CLM to the GTM in a group manner.

4. The method of claim 1, further comprising mapping a local log sequence number (LSN) associated with the plurality of master nodes to a global LSN.

5. The method of claim 4, further comprising transmitting the global LSN to the GTM.

6. The method of claim 1, further comprising mapping a local log sequence number (LSN) associated with the plurality of master nodes to a global LSN.

7. The method of claim 1, wherein detecting a write-write conflict further comprises:
   when the block number associated with the one REDO log is present in the hash table, checking the master node IDs associated with the one REDO log and the hash table;
   when both the master node IDs are same, a write-write conflict is not detected and the latest LSN is updated with the end LSN associated with the one REDO log;

when both the master IDs are different, comparing the base LSN and the latest LSN;

when the base LSN is greater than the latest LSN, a write-write conflict is not detected and the latest LSN is updated with the end LSN associated with the one REDO log; and when the base LSN is smaller than the latest LSN, a write-write conflict is detected and the transaction associated with the one REDO log is aborted.

8. The method of claim 7, further comprising persisting the transaction associated with the one REDO log in a common storage when a write-write conflict is not detected between the one REDO log and any other REDO log of the plurality of REDO logs prior to committing the transaction associated with the one REDO log.

9. A system comprising:
a processor;
a non-transitory memory storing instructions which, when executed by the processor, cause the system to detect and resolve write-write conflicts among a plurality of transactions received from master nodes of a multi-writer database system by:
  receiving a plurality of REDO logs and storing the plurality of REDO logs in a buffer, each REDO log associated with the one of the plurality of transactions;
  selecting one REDO log of the plurality of REDO logs;
  persisting the transaction associated with the one REDO log in a local storage associated with a common log module (CLM) when a write-write conflict is detected between the one REDO log and at least one other REDO log of the plurality of REDO logs prior to committing the transaction associated with the one REDO log; and
  transmitting a status of the transaction associated with the one REDO log to a global transaction manager (GTM);
  wherein a write-write conflict is detected by:
  extracting from the one REDO log a master node identity (ID), a base log sequence number (LSN), and a block number associated with the one REDO log;
  extracting a current status of a hash table, wherein the hash table contains block numbers, master node IDs and the corresponding LSNs;
  checking for the presence of the block number associated with the one REDO log in the hash table; and
  when the block number associated with the one REDO log is not present in the hash table, a write-write conflict is not detected and the block number, master node ID and the end LSN associated with the one REDO log in the hash table are updated.

10. The system of claim 9, wherein the selecting, the persisting, and the transmitting are repeated for each REDO log stored in the buffer.

11. The system of claim 10, wherein the transactions persisted in the local storage to the CLM in a group manner.

12. The system of claim 9, wherein the instructions, when executed by the processor, cause the system to detect and resolve write-write conflicts further by: mapping of a local log sequence number (LSN) associated with the plurality of master nodes to a global LSN.

13. The system of claim 12, wherein the instructions, when executed by the processor, cause the system to detect and resolve write-write conflicts further by: transmitting the global LSN to the plurality of master of master nodes.

14. The system of claim 12, wherein the instructions, when executed by the processor, cause the system to detect and resolve write-write conflicts further by: transmitting the global LSN to the GTM.

15. The system of claim 9, wherein a write-write conflict is detected by:
when the block number associated with the one REDO log is present in the hash table, checking the master node IDs associated with the one REDO log and the hash table;

when both the master node IDs are same, a write-write conflict is not detected and the latest LSN is updated with the end LSN associated with the one REDO log;

when both the master IDs are different, comparing the base LSN and the latest LSN;

when the base LSN is greater than the latest LSN, a write-write conflict is not detected and the latest LSN is updated with the end LSN associated with the one REDO log; and when the base LSN is smaller than the latest LSN, a write-write conflict is detected and the transaction associated with the one REDO log is aborted.

16. The system of claim 15, wherein the instructions, when executed by the processor, cause the system to detect and resolve write-write conflicts further by: persisting the transaction associated with the one REDO log in a common storage when a write-write conflict is not detected between the one REDO log and any other REDO log of the plurality of REDO logs prior to committing the transaction associated with the one REDO log.

* * * * *

UNITED STATES PATENT AND TRADEMARK OFFICE
CERTIFICATE OF CORRECTION

PATENT NO. : 11,520,747 B2
APPLICATION NO. : 16/700459
DATED : December 6, 2022
INVENTOR(S) : Yuk Kuen Chan et al.

It is certified that error appears in the above-identified patent and that said Letters Patent is hereby corrected as shown below:

In the Claims

Column 15, Claim 7, Line 1 should read: --when both the master node IDs are different--

Column 16, Claim 15, Line 21 & 22 should read: --wherein a write-write conflict is detected:--

Column 16, Claim 15, Line 32 should read: --when both the master node IDs are different--

Signed and Sealed this
Twenty-third Day of May, 2023

Katherine Kelly Vidal
*Director of the United States Patent and Trademark Office*